Patented Oct. 29, 1929

1,733,879

UNITED STATES PATENT OFFICE

ALBERT H. HOOKER AND WILLIAM JUDSON MARSH, OF NIAGARA FALLS, NEW YORK, ASSIGNORS TO HOOKER ELECTROCHEMICAL COMPANY, OF NIAGARA FALLS, NEW YORK, A CORPORATION OF NEW YORK

PROCESS OF PURIFYING CAUSTIC SODA

No Drawing. Application filed August 12, 1926, Serial No. 128,908. Renewed March 14, 1929.

This invention relates to the production of caustic soda of relatively high purity from crude solutions thereof such as the solutions or so-called cell liquors produced by the customary electrolytic process.

In the manufacture of caustic soda by the electrolysis of sodium chloride solutions or brine using diaphragm cells efficient operation will not permit the conversion of more than about 50 percent of the sodium chloride (NaCl) content of the solution into sodium hydroxide (NaOH). As a consequence the direct product of the electrolytic operation, i. e., the cathode or so-called cell liquor is a solution containing about three parts by weight of NaCl to two parts by weight of NaOH, a typical cell liquor made from saturated brine having approximately the following composition:

1000 parts by weight of NaOH.
1500 parts by weight of NaCl.
7700 parts by weight of water.

The solution may and usually does contain impurities other than the sodium chloride, such as iron compounds and sodium sulfate which may be removed by the purifying operation to be described giving a caustic soda product of high purity with respect to these materials but the process of the invention is designed primarily for the purification of caustic soda with respect to sodium chloride and in the following description the presence of other impurities and their removal incident to the removal of sodium chloride will be disregarded.

A customary method of making commercial caustic soda from such a solution or cell liquor is to concentrate it in a vacuum pan, removing the sodium chloride deposited during the concentration, up to a point at which, for instance, about 900 parts by weight of the original 7700 parts by weight of water and about 45 to 50 parts by weight of the original 1500 parts by weight of NaCl and practically all of the original 1000 parts by weight of NaOH remain in the solution, cool the concentrated solution to about room temperature whereby salt is precipitated and the NaCl content of the solution is reduced to about 20 parts by weight without substantial precipitation of caustic soda and then evaporate the solution to fusion. The product so obtained contains only about 2 percent of NaCl calculated on NaOH, is practically free of other impurities, and is suitable for most commercial uses. If it is attempted to further purify the caustic soda by cooling the concentrated solution to temperatures below about atmospheric temperature as described, a thick viscous liquid containing crystallized sodium chloride in suspension and from which the crystallized sodium chloride will not settle or a mixture of caustic soda and sodium chloride crystals results without any further improvement in the purity of the caustic soda.

For some purposes, for instance in the manufacture of artificial silk, the 2 percent of NaCl in the caustic soda produced as described is detrimental and it is therefore an object of our invention to provide an economical process for the production of caustic soda of relatively great purity particularly with respect to its sodium chloride content from crude solutions of caustic soda such as those produced by the electrolytic process. The process of our invention is, of course, particularly designed for the production of caustic soda from diaphragm cell cathode liquor, but it is apparent and is to be understood that the process of the invention does not include the electrolytic process and is not limited to the treatment of electrolytically produced solutions or even to solutions of the particular composition referred to. The process is applicable generally for the treatment of solutions of caustic soda containing sodium chloride with or without other impurities such as sodium sulfate and iron compounds regardless of their source.

The process of our invention consists generally in concentrating the solution of caustic soda such as cathode liquor by evaporation at elevated temperature and then cooling to about atmospheric temperature whereby sodium chloride is precipitated while the caustic soda is held in solution as in the known process, and then, after separating the precipitated salts, diluting the solution to a point at which the residual sodium chloride will be held in solution when it is cooled to the point at which caustic soda crystallizes in a form readily separable from mother liquor. This caustic soda may be crystallized from the diluted solution free of contamination by co-precipitated sodium chloride.

For the practical operation of the process as broadly outlined above several features to be described in detail hereinafter must be observed.

In the first place, since the caustic soda solution is treated repeatedly, yielding only a portion of its caustic soda content in the form of crystals at each cycle of the procedure outlined and since each cycle involves a concentration followed by dilution it is important to operate the process within such limits of concentration and dilution that a maximum yield of caustic soda crystals for a given unit of concentration is obtained. A further factor to be considered in this connection from the standpoint of practical operation is the point to which the caustic soda solution is concentrated because as the concentration of the solution increases the amount of heat required to distill a unit of water from it increases and the wear and tear upon the concentrating apparatus increases, particularly at concentrations approaching or exceeding 50% caustic soda. Consequently, it is desirable to operate the process at the lowest concentration of the caustic soda solution consistent with the yield of caustic soda per unit of dilution.

The cooling of the caustic soda solution following the concentrating operation for the elimination of salt and prior to cooling for the crystallization of caustic soda is of primary importance since this cooling operation eliminates a relatively large proportion of the residual quantity of sodium chloride in the solution and thus greatly reduces the quantity of dilution required for a given yield of caustic soda crystals.

A further important feature of the process in practical operation resides in the separation of mother liquor from the crystallized caustic soda since we have found the usual methods of separating mother liquor from crystals as by simple draining or centrifuging leave a quantity of mother liquor amounting to about 10% of the weight of the crystals adhering to them with a corresponding contamination of the caustic soda product whereas by careful sweating, displacement washing or by the use of a high speed continuous centrifuge the quantity of mother liquor adhering to the crystals may be reduced to 5% or even down to 2½%. The use of a high speed continuous centrifuge is preferred at present but as is apparent other methods of separating the mother liquor either now known or to be developed in the future may be applied without departing from our invention.

Still another important detail of the process has to do with the crystallization of the caustic soda. It has been found that a caustic soda solution may be strongly supercooled, that is, cooled to a strongly supersaturated condition in the absence of seed crystals without crystallization and that this supersaturated condition is remarkably stable. Caustic soda solutions such as those involved in the process may be supercooled as much as 20° C. and in this supercooled condition are stable against such known methods of inducing crystallization as agitation, scratching the wall of the receptacle, introducing dust, etc. After considerable experimentation it was found that crystallization could be induced quite readily by the use of seed crystals or by the application of sufficiently strong supercooling. Since strong supercooling of a large batch of caustic soda solution is expensive the practical operation of the process involves the use of seed crystals preserved for that purpose from a previous batch or produced by strong supercooling of a relatively small quantity of the solution. It will be understood that in the operation of the process some of the crystals formed in the crystallization of one batch of caustic soda may be left in the crystallizing vessel and automatically serve to seed a subsequent batch of caustic soda solution. However, since the caustic soda crystals melt at atmospheric temperature this automatic seeding cannot be relied upon.

Therefore the invention resides more particularly in the determination of conditions or combinations of conditions within the range of the general procedure defined which are suitable for practical operation.

The following examples illustrate the invention and indicate the limiting and the preferred conditions for the practical operation of the process. For the sake of brevity and clearness the examples are given in the form of tabulations:

*Example 1*

|  | NaOH | NaCl | $H_2O$ |
|---|---|---|---|
| Cell liquor composition | 1000 | 1500 | 7700 |
| Concentrate and remove |  | 1456 | 6800 |
| leaving at a concentrating temperature of 80° C. | 1000 | 44 | 900 |
| Cool to 30° C. depositing |  | 22 |  |
| and leaving at 30° C. | 1000 | 22 | 900 |
| Dilute with |  |  | 800 |
| giving | 1000 | 22 | 1700 |
| Cool to about 10° C. depositing | 500 |  | 787.5 |
| and leaving a mother liquor containing | 500 | 22 | 912.5 |
| or | 1000 | 44 | 1825 |

It is noted that the NaCl solubility in this mother liquor at 10° C. is about 65 parts by weight, that the mother liquor contains only 44 parts of NaCl, that the example calls for a dilution with 800 parts by weight of water for a recovery of 500 parts by weight of NaOH.3½H₂O, and that it involves concentration up to over 50% NaOH.

*Example 2*

|  | NaOH | NaCl | H₂O |
|---|---|---|---|
| Cell liquor composition | 1000 | 1500 | 7700 |
| Concentrate and remove |  | 1445 | 6500 |
| leaving at 80° C | 1000 | 55 | 1200 |
| Cool to 30° C. depositing |  | 25 |  |
| and leaving at 30° C | 1000 | 30 | 1200 |
| Dilute with |  |  | 500 |
| giving | 1000 | 30 | 1700 |
| Cool to 10° C. depositing | 500 |  | 787.5 |
| and leaving a mother liquor containing | 500 | 30 | 912.5 |
| or | 1000 | 60 | 1825 |

It is noted that the NaCl solubility in this mother liquor at 10° C. is about 65 parts by weight, that the mother liquor contains only 60 parts by weight of NaCl, that the example calls for a dilution with 500 parts of water for a recovery of 500 parts by weight of NaOH.3½H₂O, and that it involves concentration up to about 45% NaOH.

*Example 3*

|  | NaOH | NaCl | H₂O |
|---|---|---|---|
| Cell liquor composition | 1000 | 1500 | 7700 |
| Concentrate and remove |  | 1425 | 6200 |
| leaving at 80° C | 1000 | 75 | 1500 |
| Cool to 30° C. depositing |  | 30 |  |
| and leaving at 30° C | 1000 | 45 | 1500 |
| Dilute with |  |  | 300 |
| giving | 1000 | 45 | 1800 |
| Cool to 10° C. depositing | 500 |  | 787.5 |
| and leaving a mother liquor containing | 500 | 45 | 1012.5 |
| or | 1000 | 90 | 2025 |

It is noted that the NaCl solubility in this mother liquor at 10° C. is about 90 parts by weight, that the mother liquor contains 90 parts by weight of NaCl, that the example calls for dilution with only 300 parts of water for a recovery of 500 parts of NaOH.3½H₂O, and that it involves concentration to only about 40% NaOH.

In the foregoing examples the NaCl content given for the solutions after the deposition of sodium chloride by concentration and cooling is somewhat higher than the solubility of NaCl in the solution at the temperature to which they are cooled. For instance in Example 1, the NaCl content is given as 22 parts by weight, whereas the solubility of NaCl in the solution is only about 19 parts by weight. The difference, 3 parts by weight, is due to the presence of suspended salt in the solution.

By comparison of the foregoing examples, it is seen that Example 1 involves a concentration of the cell liquor to a point higher than is desirable, i. e., to about 50% NaOH at and approaching which concentration the removal of water by evaporation becomes increasingly difficult and the wear and tear upon the concentrating apparatus is more pronounced, and moreover, that the amount of dilution required for a unit yield of caustic soda is rather high, 800 parts by weight of water for 500 parts by weight of $$NaOH.3½H_2O.$$

As previously stated, high dilution in undesirable because the dilution water must be evaporated in the treatment of the mother liquor for the recovery of its caustic soda content.

Example 3 represents about the lowest limit of operation with respect to the concentration of the caustic soda solution. This example represents a desirable condition in that the concentration of the caustic soda solution is low and consequently evaporating costs are low and the yield of caustic soda per unit of dilution is high but the concentration of NaCl in the mother liquor is practically at the saturation point of the solution and consequently careful operation is required to prevent the deposition of NaCl with the crystallized caustic soda. Another factor to be considered in connection with this example is the sodium chloride content of the mother liquor which adheres to the caustic soda crystals. In general the greater the sodium chloride content of the mother liquor the greater will be the sodium chloride contamination of the caustic soda product by adhering mother liquor or the greater will be the cost of treatment for the removal of mother liquor from the crystallized caustic soda. For the production of caustic soda of maximum purity with respect to sodium chloride without undue cost of treatment for the removal of mother liquor it is, therefore, desirable to operate at lower sodium chloride concentration in the mother liquor. As is apparent in this Example 3, the operation could be improved in certain directions by depositing less caustic soda from the solution, but this gives rise to corresponding disadvantages with respect to dilution and particularly with respect to handling costs. It is obviously desirable in commercial operation to recover the maximum quantity of caustic soda at each cycle of the procedure.

Example 2 represents conditions intermediate those of Examples 1 and 3 which in general are preferred. In this example the concentration of the caustic soda solution does not reach the point at which concentration becomes difficult and expensive, the dilution per unit yield of caustic soda is relatively small, and the sodium chloride content of the mother liquor is not excessive.

The examples of the process might be multiplied indefinitely but the foregoing are believed to be sufficient to illustrate the principles involved in the invention and to enable one skilled in this art to select the preferred or optimum conditions for practical operation under any chosen set of circumstances.

It is to be understood that the invention is not limited with respect to the temperatures referred to in the examples. The temperature, 80° C., given in each of the examples as the temperature of the cell liquor after concentration is selected merely as the average temperature of the solutions as delivered from vacuum pans. But the cell liquor may be concentrated in any suitable manner, for instance, in open pans and the temperature of the resulting concentrated solution is of no importance. The temperature, 30° C., given in each example is given as an average atmospheric temperature. A higher or lower temperature may be employed consistent with the economy of the process. If the concentrated solution is cooled to a higher temperature for the removal of sodium chloride prior to dilution then the residual sodium chloride content of the solution will be greater which, as is apparent, will effect the temperature to which the solution may be cooled in the precipitation of caustic soda and also the sodium chloride content of the mother liquor. If the concentrated solution is cooled to below 30° C. prior to dilution, its sodium chloride content will be reduced with corresponding advantages with respect to the sodium chloride content of the mother liquor and the quantity of caustic soda which may be crystallized but a corresponding disadvantage with respect to the time required and power consumption in the cooling operation and also, if the cooling is carried too low, with respect to the removal of suspended sodium chloride from the rather viscous solution. The temperature to which the diluted solution is cooled for the precipitation of caustic soda is largely a matter of choice depending upon the cooling facilities at hand, the proportion of the caustic soda content of the solution which it is desired to precipitate, the sodium chloride content of the solution etc.

The preferred conditions of operation, therefore, are as follows:

(1) Concentration.

The cell liquor is concentrated to at least about 40% NaOH content and not substantially above 45-46%.

(2) Cooling for the removal of sodium chloride.

The concentrated solution is cooled to about atmospheric temperature, say from 20 to 35° C., preferably 30° C.

(3) Dilution.

The dilution of the concentrated and cooled solution should be as small as possible and should not exceed about one part by weight of diluting water for one part by weight of NaOH.3½H₂O recovered.

(4) Cooling to precipitate NaOH.3½H₂O.

The diluted solution should be cooled to about 10–15° C. since lower temperatures are difficult and expensive to attain and higher temperatures are less efficient with respect to the caustic soda yield.

(5) A crystallization of about half of the caustic soda content of the solution represents an average preferred operation.

As has been previously stated, it is preferred to carry out the crystallization of the caustic soda by seeding, either automatically or by the use of seed crystals preserved from a previous operation or by supercooling a small portion of the solution to a point at which spontaneous crystallization occurs, and the removal of mother liquor from the caustic soda crystals by sweating, displacement leaching or by the use of a high speed continuous centrifuge down to 5 parts by weight or less of mother liquor per 100 parts by weight of crystals is highly important for the production of a caustic soda product of high purity.

We claim—

1. Process for the purification of caustic soda which comprises preparing a solution containing from about 40% to about 46% of NaOH and substantially saturated with NaCl at about atmospheric temperature, diluting the solution with water, and cooling the solution below the point at which it becomes saturated with respect to

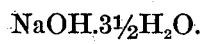

NaOH.3½H₂O.

2. Process for the purification of caustic soda which comprises preparing a solution containing NaOH in quantity exceeding that of a saturated solution at a temperature of about 10° C., but not substantially exceeding 46% and saturated with NaCl at a temperature in the neighborhood of 30° C., diluting the solution with water, and crystallizing caustic soda from the solution by cooling.

3. Process for the purification of caustic soda which comprises concentrating a solution containing about 1000 parts by weight of NaOH, 1500 parts by weight of NaCl and about 7700 parts by weight of water up to a concentration of at least about 40% NaOH, but not substantially exceeding 46% NaOH, cooling the concentrated solution to about 30° C., separating sodium chloride deposited during the concentrating and cooling operation from the solution, diluting the solution with a quantity of water not substantially in excess of one part by weight of water for each two parts by weight of NaOH in the solution, cooling the solution to a temperature of about 10° C., and seeding the solution with crystals of NaOH.3½H₂O.

4. Process for the purification of caustic soda which comprises preparing a solution the NaOH content of which is greater than that of a saturated solution of NaOH at 0° C., and substantially saturated with NaCl at a temperature materially above atmospheric temperature, cooling the solution to a temperature sufficiently low to induce crystallization of NaCl, but not sufficiently low to induce crystallization of NaOH.3½H₂O, removing the crystallized NaCl from the solution, diluting the solution with water, and cooling the diluted solution to a temperature sufficiently low to produce supersaturation with respect to $NaOH.3\frac{1}{2}H_2O$.

5. Process for the purification of caustic soda which comprises preparing a solution containing from about 40% to about 46% of NaOH and substantially saturated with NaCl at a temperature of at least about 80° C., cooling the solution to a temperature of about 30° C., separating precipitated NaCl from the solution, diluting the solution with water to a concentration of NaOH greater than that of a saturated solution at a temperature of 10° C., and a concentration of NaCl less than that of a saturated solution at 10° C., and cooling the solution to the crystallizing temperature of $NaOH.3\frac{1}{2}H_2O$.

6. In a process for the purification of caustic soda comprising evaporating a solution containing NaOH and NaCl at an elevated temperature to a concentration with respect to NaOH exceeding that of a saturated solution at 0° C., diluting the concentrated solution with water, and crystallizing $$NaOH.3\frac{1}{2}H_2O$$

from the diluted solution, the step which consists in cooling the concentrated solution and separating deposited NaCl therefrom prior to diluting the solution.

7. Process for the purification of caustic soda which comprises cooling a solution containing from about 40% to about 46% of NaOH and a quantity of NaCl less than that of a saturated solution at 10° C. to a temperature of about 10 to 15° C., and seeding the solution with crystals of $NaOH.3\frac{1}{2}H_2O$.

8. In a process for the purification of caustic soda comprising cooling a solution containing caustic soda to the crystallizing temperature of $NaOH.3\frac{1}{2}H_2O$, the step which consists in seeding the cooled solution with crystals of $NaOH.3\frac{1}{2}H_2O$.

In testimony whereof, we affix our signatures.

ALBERT H. HOOKER.
WILLIAM JUDSON MARSH.